(12) United States Patent
Watanabe et al.

(10) Patent No.: US 7,297,871 B2
(45) Date of Patent: *Nov. 20, 2007

(54) ELECTRIC SUPPLY APPARATUS

(75) Inventors: Norio Watanabe, Shizuoka (JP); Naoto Kogure, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 11/294,423

(22) Filed: Dec. 6, 2005

(65) Prior Publication Data

US 2006/0134970 A1 Jun. 22, 2006

(30) Foreign Application Priority Data

Dec. 22, 2004 (JP) ............................. 2004-371179

(51) Int. Cl.
*H02G 3/04* (2006.01)
*H01B 7/00* (2006.01)

(52) U.S. Cl. ................ 174/72 A; 174/71 R; 174/72 R; 174/135

(58) Field of Classification Search ............. 174/72 A, 174/71 R, 72 R, 135, 68.1, 68.3, 69, 97, 174/98, 99 R; 248/629; 296/149, 152, 155; 191/22 R, 23 R See application file for complete search history.

(56) References Cited

U.S. PATENT DOCUMENTS

| | | | | |
|---|---|---|---|---|
| 6,603,076 | B2 * | 8/2003 | Doshita et al. | 174/72 A |
| 6,723,923 | B2 * | 4/2004 | Tsukamoto | 174/72 A |
| 6,724,613 | B2 * | 4/2004 | Doshita et al. | 174/72 A |
| 6,793,259 | B2 * | 9/2004 | Sano et al. | 296/155 |
| 6,809,264 | B2 * | 10/2004 | Watanabe et al. | 174/72 A |
| 6,811,404 | B2 * | 11/2004 | Doshita et al. | 174/72 A |
| 6,818,827 | B2 * | 11/2004 | Kato et al. | 174/72 A |
| 6,903,274 | B2 * | 6/2005 | Aoki et al. | 174/72 A |
| 6,906,262 | B2 * | 6/2005 | Fujimura | 174/72 A |
| 6,919,511 | B2 * | 7/2005 | Tsunoda et al. | 174/72 A |
| 7,075,011 | B1 * | 7/2006 | Kogure et al. | 174/72 A |
| 7,109,421 | B2 * | 9/2006 | Sekino et al. | 174/72 A |
| 7,151,224 | B2 * | 12/2006 | Kogure et al. | 174/72 A |
| 2005/0092512 | A1 * | 5/2005 | Kogure et al. | |

FOREIGN PATENT DOCUMENTS

DE 10 2004 051 363 A1 6/2005
JP 2002-17032 1/2002

* cited by examiner

*Primary Examiner*—Angel R. Estrada
(74) *Attorney, Agent, or Firm*—Kratz, Quintos & Hanson, LLP

(57) ABSTRACT

The present invention is to provide an electric supply apparatus having a wiring harness bent freely in a protector and prevented from outer interferences or rain water. An electric supply apparatus having a wiring harness includes a protector, a leaf spring disposed in the protector and a spring holder fixed to the leaf spring, wherein the spring holder holds one end portion of a flexible protective member of the wiring harness and one end portion of a rigid protective member of the wiring harness, and wherein the flexible protective member is disposed along the leaf spring and the rigid protective member is arranged from the spring holder to an opening for leading out the wiring harness. The flexible protective member has an insertion member at the one end portion, the insertion member is resin-molded with the flexible protective member and fixed to one side portion of the spring holder. The spring holder has protrusions penetrating into the flexible protective member and engaging with grooves of the rigid protective member.

7 Claims, 11 Drawing Sheets

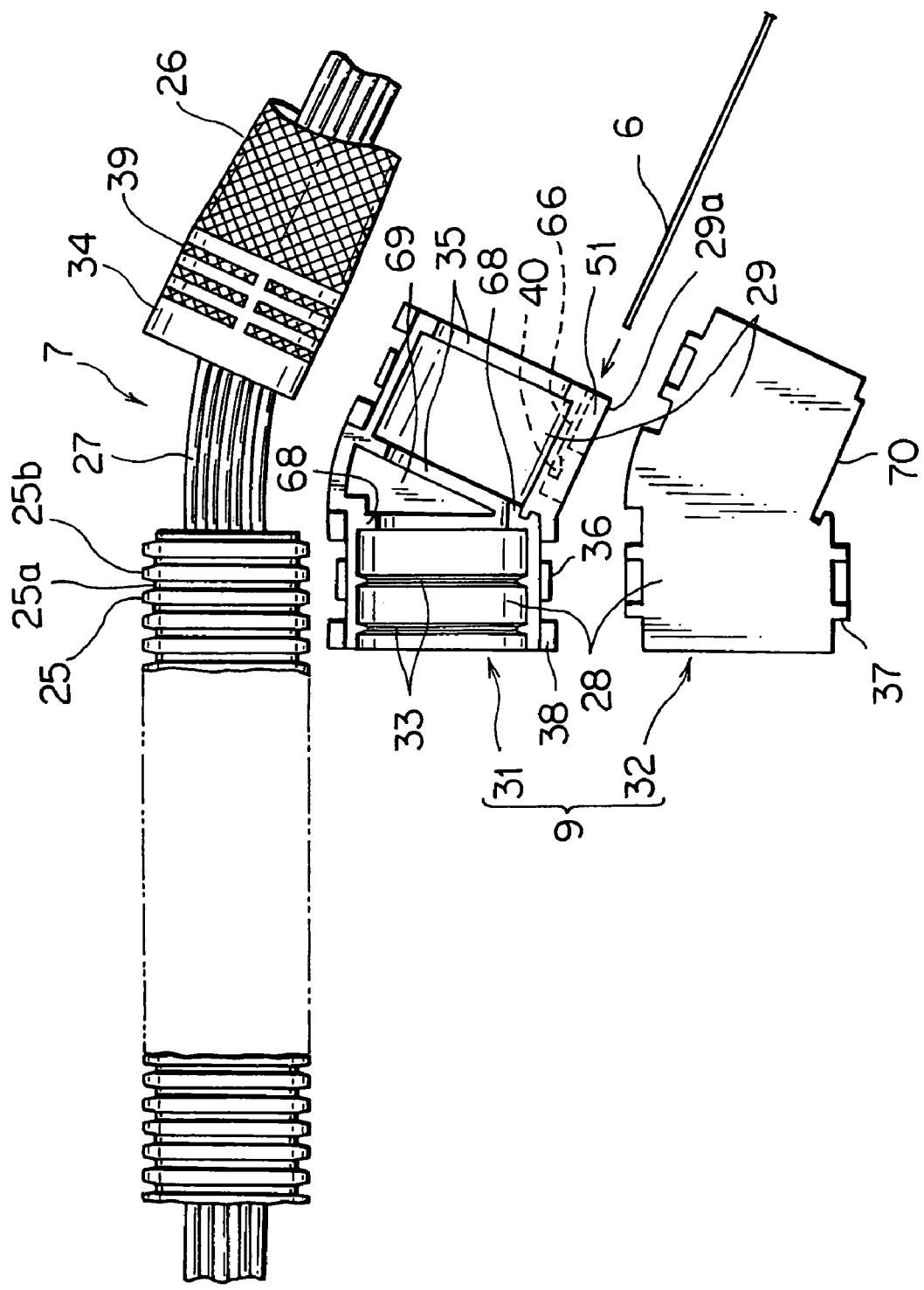
F I G. 5

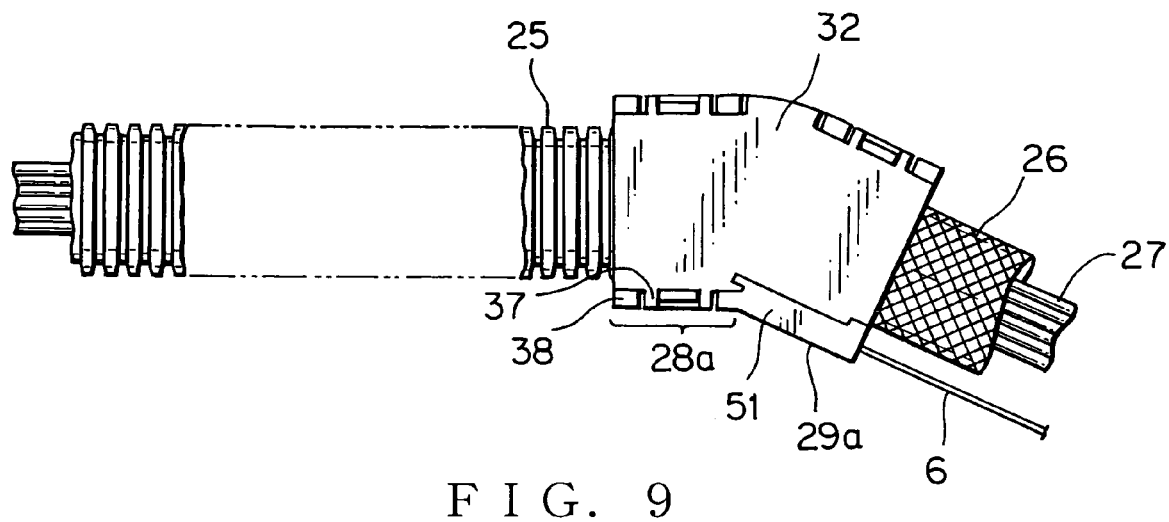
F I G. 9
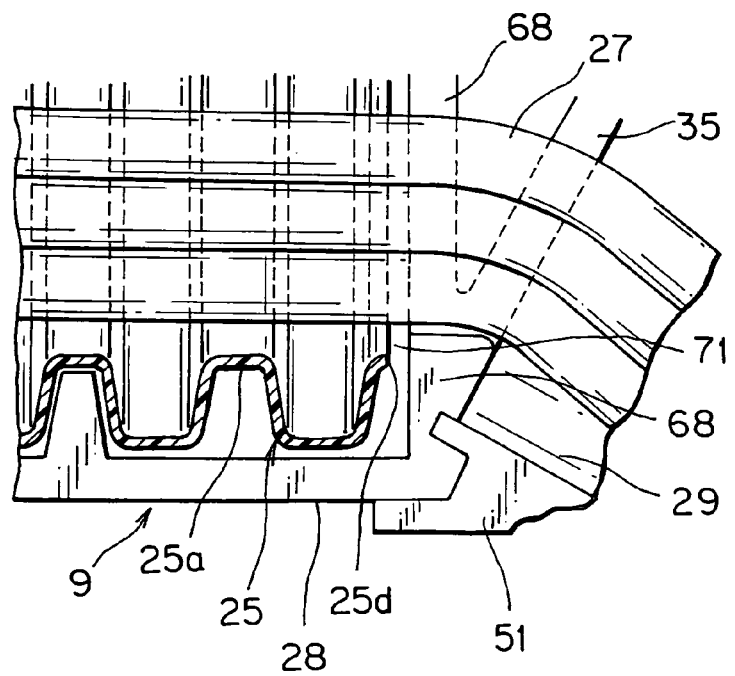
F I G. 11

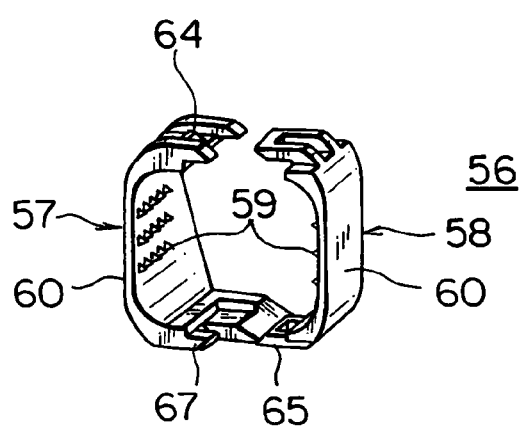
F I G. 1 3
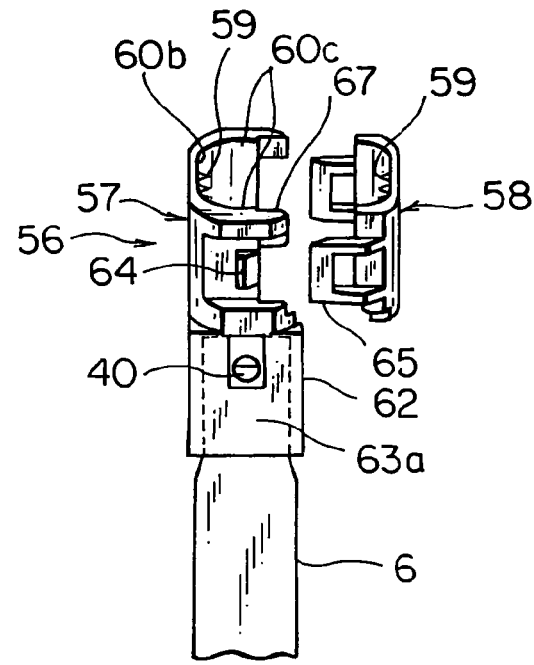
F I G. 1 4
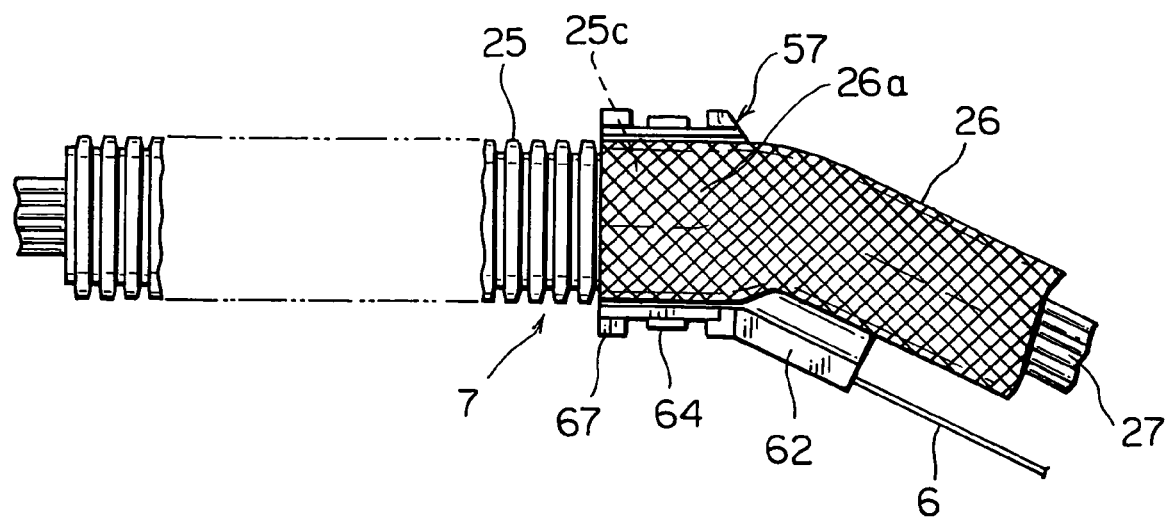
F I G. 1 5

ELECTRIC SUPPLY APPARATUS

BACKGROUND OF THE INVENTION

1. Field of the Invention

The present invention relates to an electric supply apparatus having a wiring harness being bent freely in a protector and urged by a leaf spring to absorb sag thereof.

2. Description of the Related Art

FIGS. 19 and 20 are an embodiment of a conventional electric supply apparatus, for example, JP, 2002-17032,A (page 4, FIGS. 4-5).

The electric supply apparatus 50 is disposed in a sliding door 41 of a motor vehicle. The electric supply apparatus 50 has a protector 42 (a cover is not shown), which is made of a synthetic resin, receiving a wiring harness 43 flexibly, and a metal leaf spring 44 to urge the wiring harness 43 upwardly in the protector 42.

A lower end portion of the leaf spring 44 is fixed to a forward and lower portion of the protector 42 together with the wiring harness 43. A front end portion of the leaf spring 44 supports the wiring harness 43 slidably. The front end portion of the leaf spring 44 is covered with a cap 49 made of a synthetic resin and supports stably the wiring harness 43.

The wiring harness 43 has a plurality of electric cables 43a covered with a corrugate tube 43b made of a synthetic resin. The flexible corrugated tube 43b is fixed to the protector 42 with a tape at the front and lower end portion.

One end portion of the electric cables 43a of the wiring harness 43 is led out through a front portion of the protector 42 to auxiliary units of the sliding door 41. The corrugated tube 43b of the wiring harness 43 is wired to a vehicle body 47 slidably through an elongated lower opening 45 of the protector 42 and a stepping space 46. The electric cables 43a inside the wiring harness 43 are covered by the corrugated tube 43b having a high rigidity and water proof to protect from outer interferences, water drops or dusts at a stepping space 46.

FIG. 19 shows a fully closed state of the sliding door 41 and FIG. 20 is a half opened state close to a fully opened state. The wiring harness 43 is pulled backwardly at the fully closed state, and pulled forwardly at the fully opened state. When the sliding door 41 is in the half opened state, the wiring harness 43 tends to sag downwardly. However, the leaf spring 44 urges the wiring harness 43 upwardly to absorb the sag (excess length) and prevent to be sandwiched by other portions.

In the conventional electric supply apparatus, especially for vehicles having a large sliding distance of a sliding door 41, an excess length of the wiring harness 43 in the protector becomes large so that the height of the protector becomes large and arrangements of other parts in the sliding door are reduced.

The corrugated tube 43b is utilized as a protective tube (protective member) of the wiring harness 43 in the protector. However, the corrugated tube 43b has a lower flexibility compared with a net tube (not shown) made of a synthetic resin. It is quite difficult to utilize the different kinds of the protective tubes at the same time. When the sliding door is fully closed or opened, the wiring harness 43 is strongly pulled so that the lifetime of the wiring harness 43 is reduced at the portion fixed at the protector 42.

SUMMARY OF THE INVENTION

The present invention is to provide an electric supply apparatus having a wiring harness protected against outer interferences and rain water, having a small and compact protector, giving a higher flexibility of a wiring harness in the protector, and having a long lifetime of the wiring harness.

According to a first aspect of the present invention, an electric supply apparatus having a wiring harness includes a protector, a leaf spring disposed in the protector and a spring holder fixed to the leaf spring, wherein the spring holder holds one end portion of a flexible protective member of the wiring harness and one end portion of a rigid protective member of the wiring harness, and wherein the flexible protective member is disposed along the leaf spring and the rigid protective member is arranged from the spring holder to an opening for leading out the wiring harness.

Thereby, the wiring harness is bent in a small diameter so that the protector is formed smaller. The rigid protective member is arranged from the protector inside a sliding door to the vehicle body to protect the electric cables inside the wiring harness from outside interferences or rain water. The flexible and rigid protective members are connected to each other with the spring holder. The spring holder fastens the both protective members and is fixed to the leaf spring. When the rigid protective member is pulled from outside, the tension is exerted on the leaf spring so that the flexible protective member is not subjected to the excess tension. A corrugated tube or thick vinyl tube is utilized for the rigid protective member and a thin vinyl tube is utilized for the net tube.

According to a second aspect of the present invention, the flexible protective member has an insertion member at the one end portion, the insertion member is resin-molded with the flexible protective member and fixed to one side portion of the spring holder.

The insertion member is fixed to the spring holder by means of ribs in the spring holder, locking means such as flexible arms or locking protrusions, or bolts.

According to a third aspect of the present invention, the spring holder has ribs at the other side portion thereof for engaging with grooves of the rigid protective member.

Preferably, a number or positions of the ribs is optional. The corrugated tube is suitable for the protective tube.

According to a fourth aspect of the present invention, the spring holder has protrusions, the protrusions penetrate into or pushing away the flexible protective member overlaying the rigid protective member so that the protrusions are engaged with the grooves of the rigid protective member.

An outer face of an end portion of the rigid protective member is intimately covered with an inner face of an end portion of the flexible protective member. The protrusions firmly hold the overlapped portion.

According to a fifth aspect of the present invention, the protective members are protective tubes.

Thereby, a bundle of electric cables are completely covered with the protective tubes and protected from outside interferences and rain water.

According to a sixth aspect of the present invention, the spring holder is separable and split holders are joined together with locking means.

Thereby, the both protective members are first set into one split holder and the other split holder is joined to the one holder with locking means to sandwich the both protective tubes. Preferably, the locking means include locking protrusions and engaging frames, or locking arms and engaging recesses.

According to a seventh aspect of the present invention, the electric supply apparatus further includes an annular wall disposed in the protector, the annular wall holding a base end portion of the leaf spring, the leaf spring arranged around the annular wall, and the wiring harness being bent freely outside of the leaf spring.

The both protective members are connected to each other at a loop portion of the wiring harness through the spring holder. Thereby, when the wiring harness is pulled, the loop portion has a smaller diameter against a bias of the leaf spring and expands outwardly with a restoring force of the leaf spring so as to absorb a sag of the wiring harness. The biasing force of the leaf spring is directly transferred to the protective tubes through the spring holder so that the wiring harness expands and contracts with the spring holder without slipping.

BRIEF DESCRIPTION OF THE DRAWINGS

FIG. 5 is an exploded front view showing a spring holder connecting between a corrugated tube and a net tube protecting a wiring harness;

FIG. 9 is a front view showing the connection of the both protective tubes with the holder cover being attached to the holder base;

FIG. 11 is a sectional view showing electric cables inside the spring holder;

FIG. 13 is a perspective view showing the spring holder;

FIG. 14 is a plan view showing a leaf spring attached to the spring holder;

FIG. 15 is a perspective view showing the holder base holding the both protective tubes of the wiring harness;

DETAILED DESCRIPTION OF THE PREFERRED EMBODIMENTS

FIGS. 1-4 show an embodiment of an electric supply apparatus according to the present invention.

Figure 1:
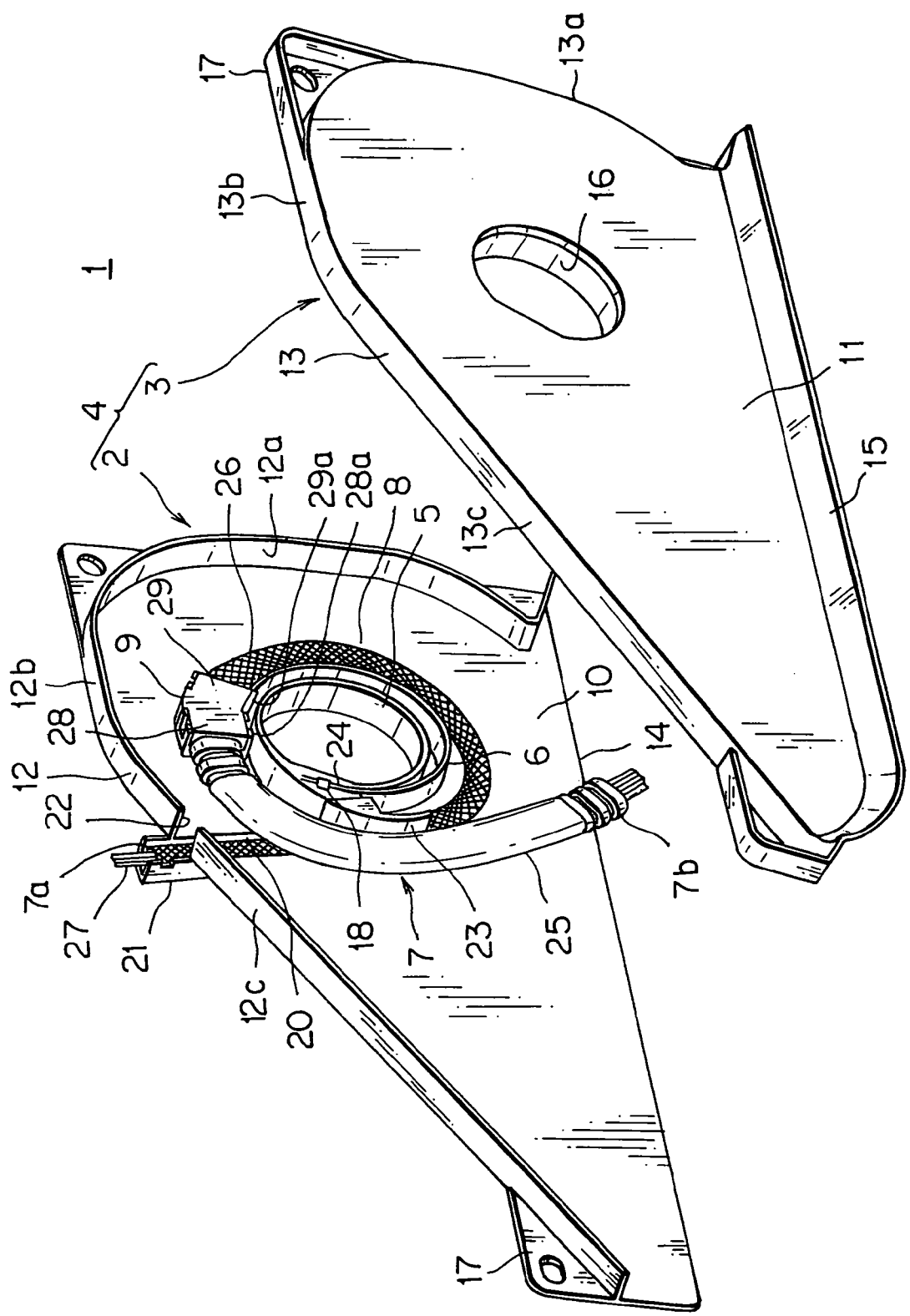
FIG. 1 is an exploded perspective view of an embodiment of an electric supply apparatus according to the present invention.

The electric supply apparatus 1, as shown in FIG. 1, includes a protector 4 having a base 2 and a cover 3 made of a synthetic resin, a leaf spring 6, being made of a metal, wound flexibly around an annular wall 5 disposed inside the base 2, a wiring harness 7 covered with a corrugated tube (rigid protective member or protective tube) 25 at one side and a net tube (flexible protective member or protective tube) 26 at the other side, and arranged around the annular wall 5 to form a loop portion 8, and a spring holder 9, being made of a synthetic resin and holding a front end portion of the leaf spring 6, for fastening a middle portion of the wiring harness 7 in a longitudinal direction, or a part of the loop portion 8 for connecting the corrugated tube 25 and the net tube 26 each other. The electric supply apparatus 1 is mounted to a sliding door, not shown, of a motor vehicle.

The base 2 and cover 3 of the protector 4 each have a triangle or trapezoidal base plate 10, 11 and a peripheral wall 12, 13 respectively. The each peripheral wall 12, 13 has a vertical front wall 12a, 13a, a horizontal upper wall 12b, 13b and a sloping rear wall 12c, 13c respectively. When the cover 3 is covered to the base 2, the peripheral wall 13 of the cover 3 is positioned around and outside the peripheral wall 12 of the base 12 and an elongated opening 14 is formed at a lower end of the protector 4 for guiding out the wiring harness 7.

Figure 19:
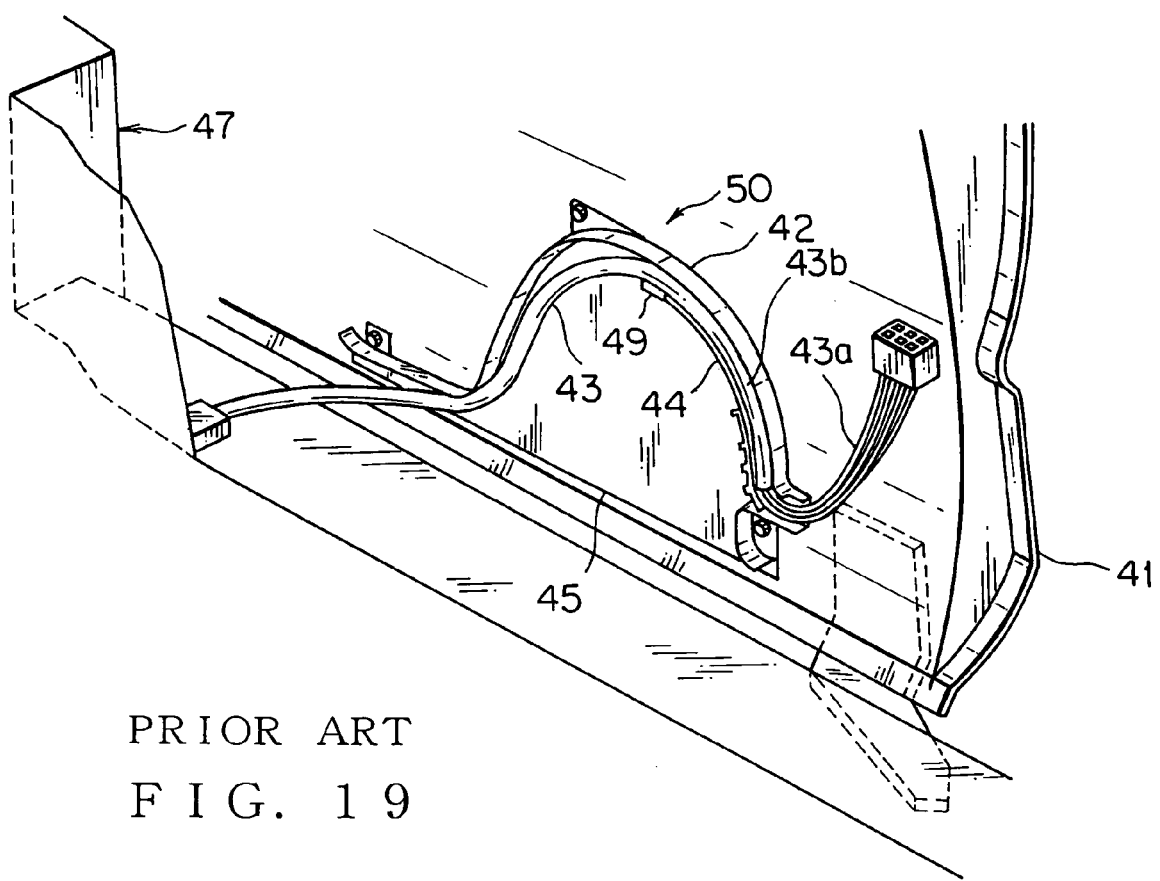
FIG. 19 is a perspective view showing an embodiment of a conventional electric supply apparatus.
Figure 20:
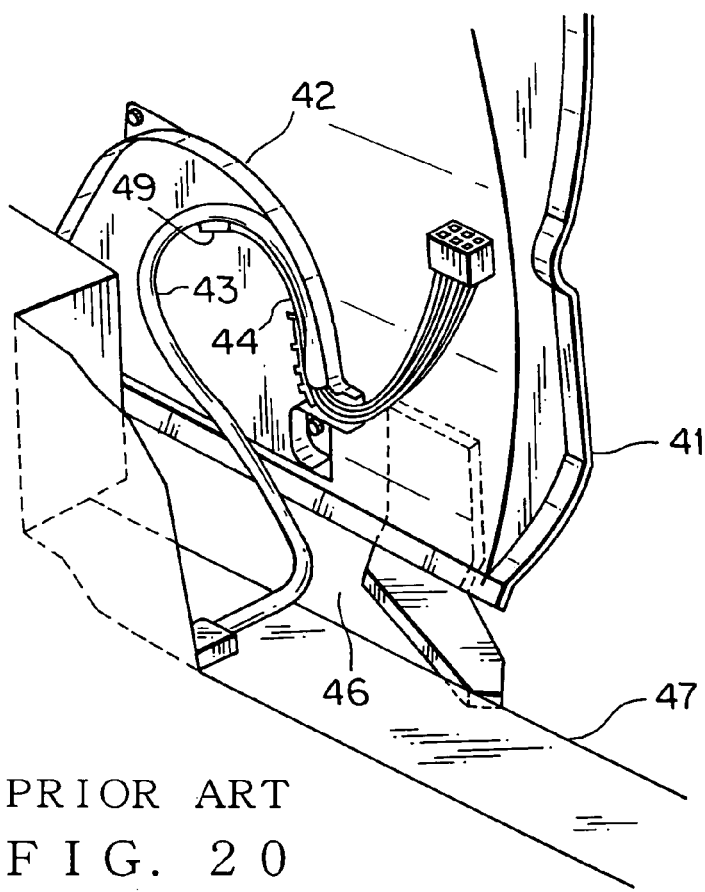
FIG. 20 is a perspective view showing an operation of the conventional electric supply apparatus.

A wiring harness guiding wall 15 with a curved section extends outwardly from the lower opening 14 of the cover 3. An annular wall 16 is disposed at the center of the cover 3 and protrudes toward the base 2 for engaging with and inside the annular wall 5 of the base 2. The protector 4 is shorter in height than the conventional one (FIG. 19). This is because the wiring harness 7 is received in the flexible net tube 26 in a loop forming manner along the annular wall 5. The protector 4 is fixed vertically to the sliding door with brackets 17.

Figure 2:
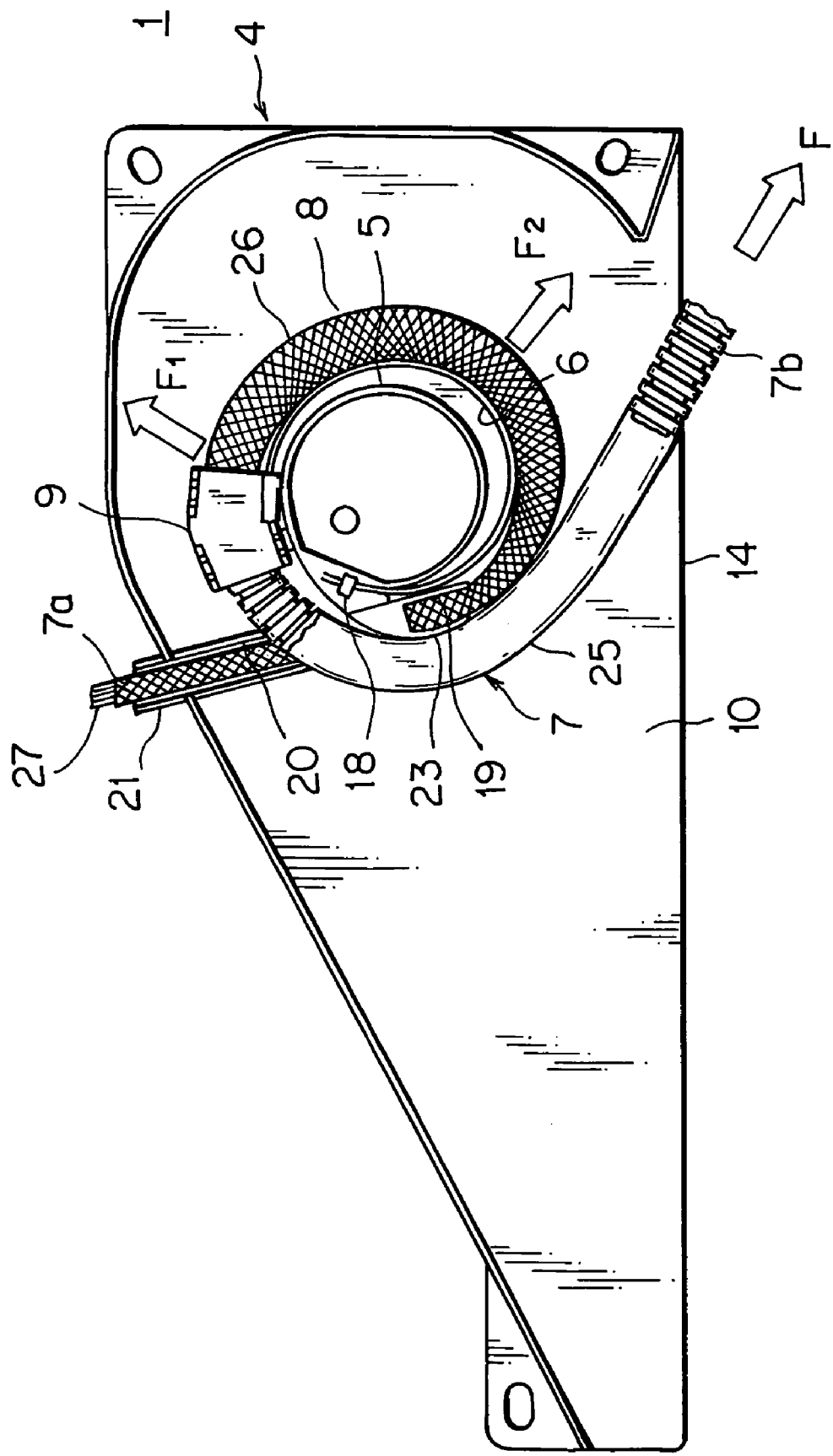
FIG. 2 is a front view showing an operation of the electric supply apparatus at fully opened state.
Figure 3:
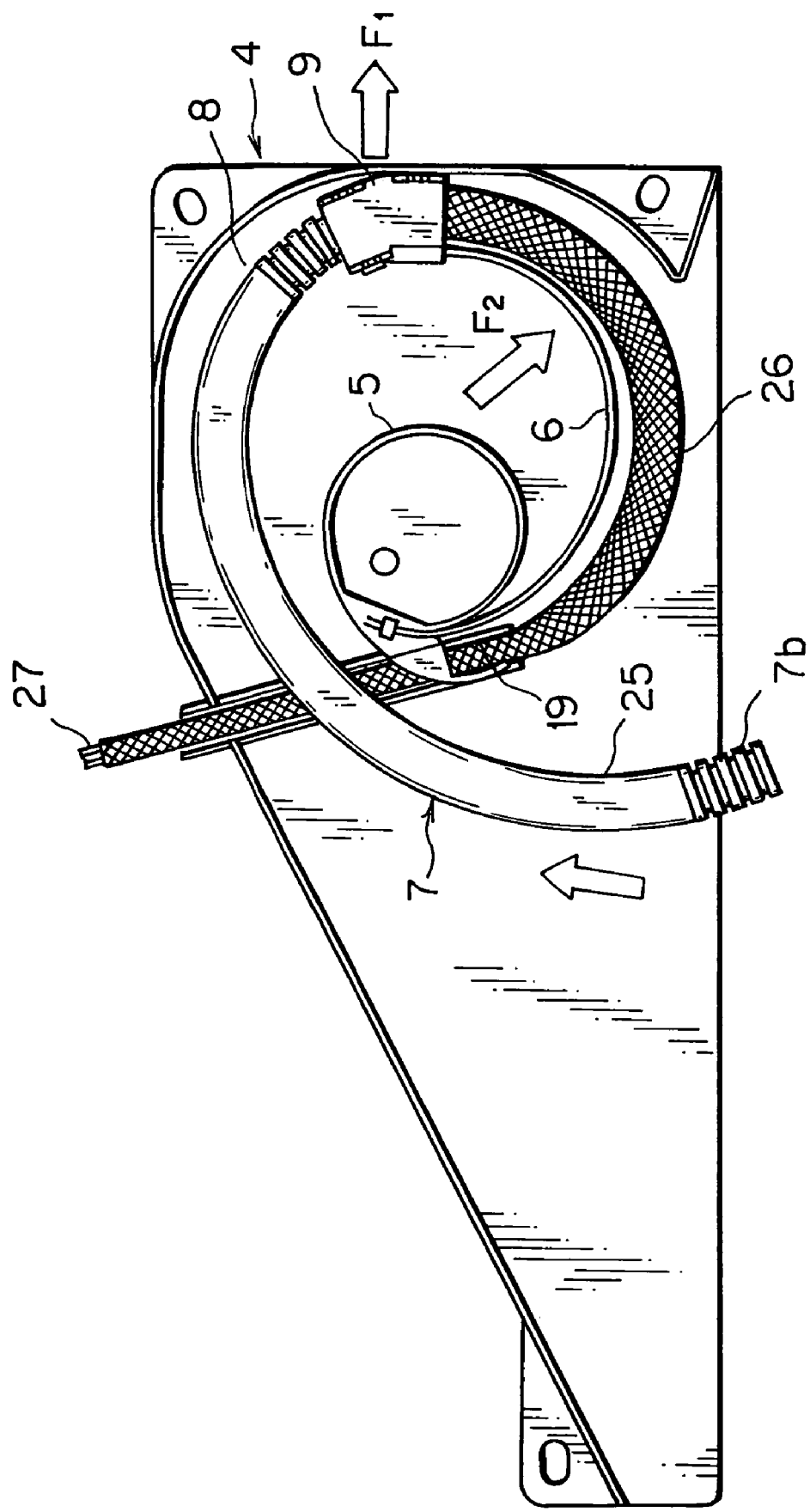
FIG. 3 is a front view showing an operation of the electric supply apparatus at half opened state.
Figure 4:
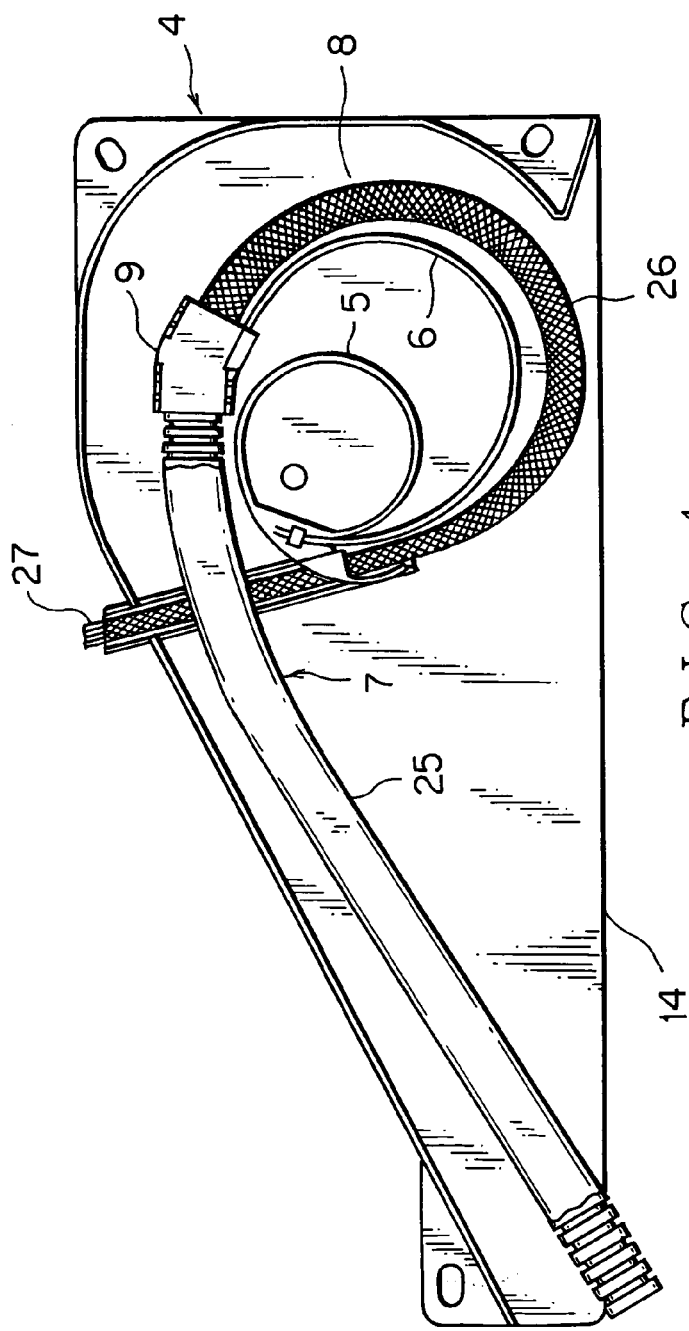
FIG. 4 is a front view showing an operation of the electric supply apparatus at fully closed state.

The annular wall 5 is disposed at about the center of the base 2. A spring holder 18 is integrally disposed at a rear side of the annular wall 5, or at the left side of FIG. 1. As shown in FIGS. 2-4, a narrow wiring harness lead-out 19 is disposed at the base plate 10 and adjacent to the rear side of the spring holder 18, and is connected to a U-shaped groove 20. The U-shaped groove 20 is located inside a gutter 21 extending outwardly from the base plate 10. A cutout 22 is formed in the peripheral wall 12 of the base 2 intersecting with the U-shaped groove 20. The net tube 26 is arranged from the annular wall 5 to the U-shaped groove 20. A curved wiring harness guiding wall 23 is disposed adjacent to the rear side of the wiring harness lead-out 19 and extends from an upper portion of the annular wall 5 with an @-shaped character. In the description, the front and rear of the electric supply apparatus 1 correspond to those of the motor vehicle.

A base end portion of the leaf spring 6 is press inserted into a slit 24 and fixed to the spring holder 18. The leaf spring 6 is disposed around about three quarters of the annular wall 5 and has an outward restoring force. Refer to FIGS. 1 and 2. The leaf spring 6 is straight without restriction and is bent resiliently to be set to the base 2.

The wiring harness 7 is arranged around the annular wall 5 and the leaf spring 6 in the loop forming manner. The net tube 26 at one side 7a of the wiring harness 7 is upwardly led out through the U-shaped groove 20 and fixed to the gutter 21 and arranged in the sliding door to connect auxiliary units such as power window unit, door lock unit or mirror unit (not shown) The corrugated tube 25 at the other side 7b of the wiring harness 7 is arranged into a vehicle body from the guiding wall 23 through the lower opening 14. A corrugated tube 25 of the wiring harness 7 can move freely inside the base plate 10 independently of the net tube 26 inside the groove 20.

The spring holder 9 is fixed to the front end portion of the leaf spring 6. The corrugated tube 25 and the net tube 26 protecting the wiring harness 7 are fixed to one side and the other side of the spring holder 9, respectively. The net, or knitted, tube 26 made of a synthetic resin is arranged from the groove 20 to the spring holder 9 along the annular wall 5. The corrugated tube 25 made of a synthetic resin is arranged from the spring holder 9 to the vehicle body through the lower opening 14. The net tube 26 and the corrugated tube 25 are connected to each other through the spring holder 9.

The net tube 26 is more flexible than the corrugated tube 25. The corrugated tube 25 has more rigidity and waterproof than the net tube 26 and safely protects the wiring harness 7 from outside interference and water immersion. The corrugated tube 7 of the embodiment has an oval section, the long axis of which is arranged parallel to the base plate 10. The wiring harness 7 includes the protective tubes 25, 26 and a plurality of electric cables 27 received therein.

The spring holder 9 has a nearly reversed V-shaped form, the open portion of V facing to the annular wall 5, and can move freely around the annular wall 5. The spring holder 9 has a first receiver face 28a and a second receiver face 29a facing to the annular wall 5. Both receiver faces 28a, 29a intersect obtusely each other. When the first receiver face 28a contacts with an outer face of the annular wall 5, the second receiver face 29a concurrently contacts with the outer face of the annular wall 5 so that the spring holder 9 can move freely around the annular wall 5 by means of the intersecting receiver faces 28a, 29a.

The corrugated tube 25 is fixed at a first holder 28 having the first receiver face 28a and the net tube 26 is fixed at a second holder 29 having the second receiver face 29a. An outer face opposing to the receiver faces 28a, 29a of the holder 9 can be a nearly V-shape or curved shape. The inner face of the holder 9 may have a curved or arced face instead of the reversed V-shaped face.

FIG. 2 shows that a right side sliding door is fully opened. The sliding door is moved backwardly with the electric supply apparatus 1. The wiring harness 7 is wound around the annular wall 5 and led out forwardly to a harness holder of the vehicle body, through the lower opening 14 of the protector 4 (the cover 3 is not shown). The net tube 26, the spring holder 9 and a part of the corrugated tube 25 are curved around the annular wall 5 in the loop manner and the leaf spring 6 has a smallest diameter inside the net tube 26.

A tension F exerted on the wiring harness 7 acts on the spring holder 9 through the corrugated tube 25 and acts on the leaf spring 6 in a lengthwise direction thereof through the spring holder 9. The metal leaf spring 6 is directly pulled so that the net tube 26, extending from the spring holder 9 to the wiring harness lead-out 19, and the electric cables 27 received therein are hardly pulled and the endurance thereof increases. The leaf spring 6 is formed with a metal so that the tension does not reduce the endurance.

In FIG. 2, the spring holder 9 at the end of the leaf spring 6 is subjected to an upward and diagonally forward force F1 due to the restoring force of the leaf spring 6. The loop forming portion 8 of the wiring harness 7 is subjected to a downward and diagonally forward force F2 at a middle portion of the leaf spring 6 due to the restoring force of the leaf spring 6. The restoring force F1 and expanding force F2 are perpendicular to each other.

FIG. 3 shows a partially opened state of the sliding door. At this state, the corrugated tube 25 of the wiring harness 7 usually hangs down between the vehicle body and the sliding door. However, the restoring force F1 of the spring holder 9 due to the leaf spring 6 and the expanding force F2 of the leaf spring 6 prevent the wiring harness 7 from hanging down. Accordingly, the loop portion 8 of the wiring harness 7 expands outwardly the annular wall 5 with a large diameter from the wiring harness lead-out 19. The corrugated tube 25 of the wiring harness 7 is returned inside the protector 4 through the lower opening 14 and the excess length is assuredly received. In FIG. 3, the restoring force F1 acts forwardly and the expanding force F2 acts diagonally forwardly and downwardly.

The front end of the leaf spring 6 is fixed to the protective tubes 25, 26 at the loop portion 8 of the wiring harness 7 through the spring holder 9. Then, an urging force of the leaf spring 6 acts directly on the wiring harness 7 so that the loop portion 8 assuredly expands and contracts without slipping and receives the excess length, or sag, of the wiring harness 7.

In FIG. 3, when the loop portion 8 expands in diameter, the net tube 26 and the electric cables 27 therein are subjected to a compressive force. The compressive force is applied to the leaf spring 6 through the spring holder 9 without acting to the net tube 26 and the electric cables 27. Accordingly, the endurance of the net tube 26 and the electric cables 27 is improved.

FIG. 4 shows the sliding door fully closed. The sliding door moves to the front side of the vehicle with the electric supply apparatus 1. The corrugated tube 25 of the wiring harness 7 is led out to the wiring harness holder of the vehicle body, not shown, through the lower opening 14 of the protector 4. The loop portion 8, or the net tube 26 and a part of the corrugated tube 25, expands in diameter with the leaf spring 6 so that the corrugated tube 25 of the wiring harness 7 slides backwardly in the lower opening 14 when the sliding door is closed.

The leaf spring 6 is directly subjected to a tension exerted on the net tube 26 through the spring holder 9. Hence, similarly to the fully opened state of the sliding door in FIG. 2, the tension is not applied to the net tube 26 and the electric cables 27 therein so that the endurance thereof is improved.

When the sliding door is opened from the closed state of FIG. 4, the operation is reversed from FIG. 4 to FIG. 3 and FIG. 2. When the sliding door is opened, the function of the leaf spring 6 and the spring holder 9 are the same as the closing operation of sliding door.

FIGS. 5 to 11 show an embodiment of an electric supply apparatus 1 of the present invention for connecting the protective tubes 25 and 26 each other with the spring holder 9.

As shown in FIG. 5 (exploded front view), the spring holder 9 has a holder base 31 (one split holder) and holder cover 32 (the other split holder) at each side. The holder base 31 and holder cover 32 are made of a synthetic resin and each has a semicircular section and bent at the center. The spring holder 9 has the first holder 28 for the corrugated tube 25 at the one end portion and the second holder 29 for the net tube 26 at the other end portion.

The first holder 28 has a plurality of ribs 33, two ribs in the present embodiment, arranged parallel to each other to be engaged with grooves 25a of the corrugated tube 25 at an inner wall of the oval tube. The first holder 28 is split into a base portion 28 and a cover portion 28 each of which has two semi-oval sectioned ribs 33 disposed at a front end portion and a middle portion of the split holder 28.

The second holder 29 has a pair of ribs 35 opposed to each other to hold an insertion member 34 of the net tube 26 at the inner wall of the oval tube. The second holder 29 is split into a base portion 29 and a cover portion 29 each of which has two opposed semi-oval sectioned ribs 35. A pitch of the ribs 33 has n times pitch of the grooves 25a of the corrugated tube 25, where n is integer such as 1, 2, 3. A distance between the ribs 35 is slightly larger than the length of the insertion member 34. The grooves 25a of the corrugated tube 25 form protrusions at the inner wall of the corrugated tube 25.

The holder base 31 and holder cover 32 are joined together with locking means such as locking protrusions 36 and engaging frames 37 and form the tube having the oval section. The spring holder 9 has the inner wall with an oval section and an outer wall with a rectangular section. The locking means are not limited to the locking protrusions 36 and engaging frames 37 but may employ locking arms and locking recesses. The first receiver face 28a of the first holder 28 are formed to be flush with the engaging frame 37, the locking protrusion 36 engaged into the frame, and ribs 38 at both sides of the frame 37 so that the first receiver face 28a is in proximal contact with the annular wall 5 of the protector (FIG. 2) and slidable thereon.

Figure 8:
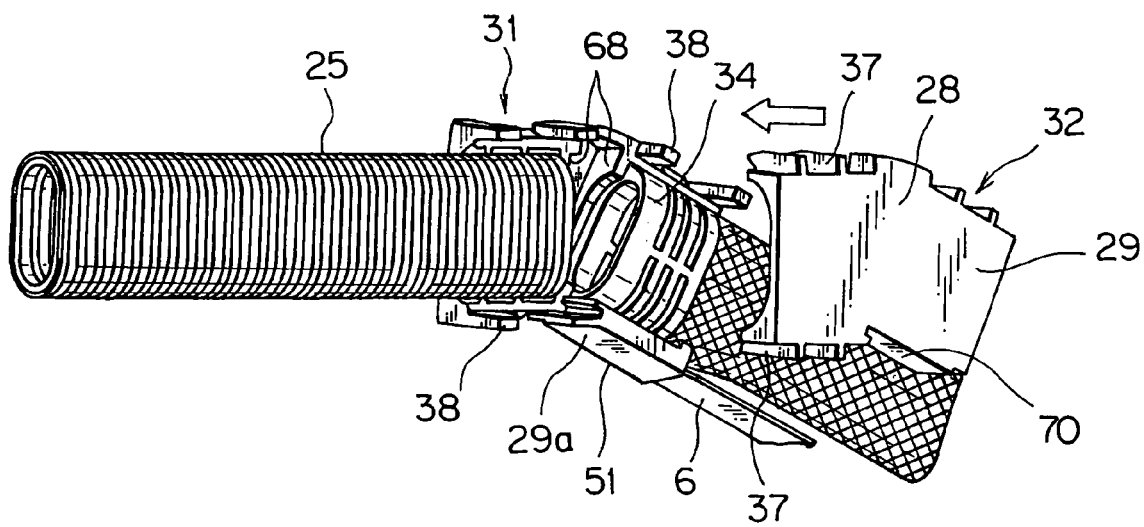
FIG. 8 is a perspective view showing that a holder base is being covered with a holder cover.

As shown in FIGS. 5 and 8, a fan-shaped space 69 is formed between the first holder 28 and the second holder 29. The fan-shaped space 69 is utilized for allowing the exposed cables 27 between the protective tubes 25, 26 to pass through. The fan-shaped space 69 has a rib 68 at the first holder side and the rib 35 at the second holder side. The rib 68 is arranged parallel to the ribs 33 for holding the corrugated tube 25. The bent form of the spring holder 9 forms the fan-shaped space 69. In the case of a straight holder, the fan-shaped space is not formed.

Figure 6:
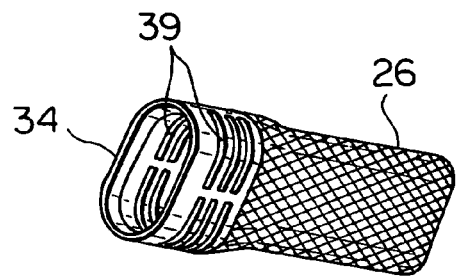
FIG. 6 is a perspective view showing an embodiment of an end portion of the net tube.

As shown in FIGS. 5 and 6, the insertion member 34 has an oval section and is formed with insert molding by inserting an end portion of the net tube 26 into a synthetic resin material in a molding tool so that the insertion member 34 is formed integral with the net tube 26. Grooves 39 are formed at an inner wall and outer wall of the insertion member 34. The net tube 26 is embedded into a middle portion of a thickness of the insertion member 34 and is exposed at the grooves 39. The insertion member 34 is firmly fixed to the net tube 26. The ribs 33 utilized at the first holder 28 can be used for engaging with the grooves 39 disposed around the insertion member 34 instead of the pair of the ribs 35.

Figure 10:
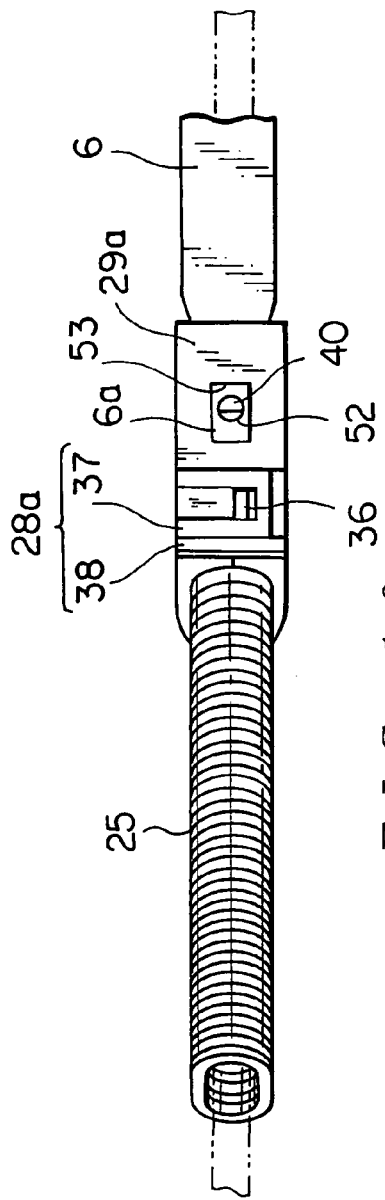
FIG. 10 is a plan view showing the connection of the protective tubes when viewed from a receiver face side of the spring holder.

As shown in FIGS. 5 and 10, a leaf spring holder 51 having a slit 66 for inserting the leaf spring 6 and a locking protrusion 40 inside the slit is disposed at the second receiver face 29a of the second holder 29 of the holder base 31. The locking protrusion 40 is generally cylindrical (FIGS. 5 and 10) and has a slope and a vertical locking face for engaging the leaf spring 6.

A front end portion 6a of the leaf spring 6 is formed narrow and has a circular engaging through-hole 52 to be engaged with the locking protrusion 40. An opening 53 is disposed at the second receiver face 29a of the holder base 31 and is opposed to the locking protrusion 40. Fixing structure of the leaf spring 6 is same as that of conventional spring caps. An angle between the first receiver face 28a of the first holder 28 and the second receiver face 29a of the second holder 29 is set to contact with the outer face of the annular wall 5 of the protector 4.

As shown in FIG. 5, the second holder 29 of the holder cover 32 is formed not to cover the leaf spring holder 51 of the holder base 31. As shown in FIGS. 8 and 9, a lower wall 70 of the second holder 29 of the holder cover 32 is joined to an upper portion of the leaf spring holder 51.

Figure 7:
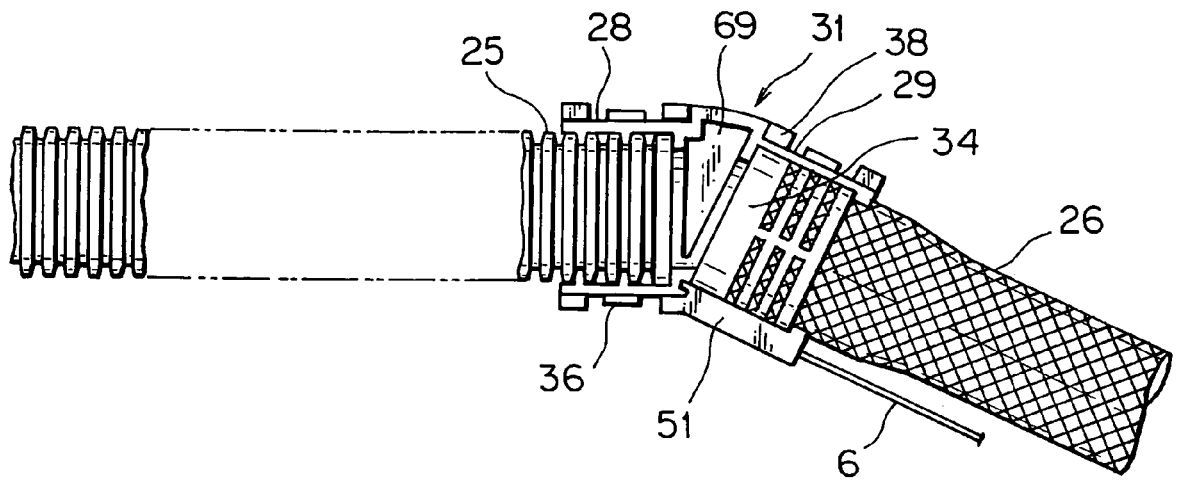
FIG. 7 is a front view showing a connection between the protective tubes fixed to the spring holder.

An assembling is performed as follows. The plurality of the electric cables 27 are inserted into the corrugated tube 25 and the net tube 26 as shown in FIG. 5. As shown in FIG. 7, an end portion of the corrugated tube 25 is engaged with the first holder 28 of the holder base 31. The insertion member 34 of the net tube 26 is engaged with the second holder 29 of the holder base 31. As shown in FIGS. 8 and 9, the holder cover 32 is covered to the holder base 31 for locking to obtain the assembly given in FIGS. 9 and 10. Then, both the corrugated tube 25 and the net tube 26 are easily and firmly connected to each other against tension through the spring holder 9.

FIG. 11 shows the assembled state of the electric cables 27 inserted into the spring holder of FIG. 10. The rib 68 of the first holder 51 at the center and a bent portion of the spring holder 9 extends inwardly and higher than an end 25d, or cutting end, of the corrugated tube 25. The electric cables 27 are supported by an end of the rib 68 and a gap 71 is formed between the end 25d and the electric cables 27 not to contact with each other. This arrangement is same all around the rib 68 so as to prevent damage and wear to the electric cables 27 resulting from an interference with the end 25d of the corrugated tube 25.

The ribs 35 of the second holder 29 also extend inwardly from the net tube 26 and are higher than that of an inner face at an end of the insertion member 34. Hence, the interference between the inner face at the end of the insertion member 34 and the electric cables 27 is prevented so as to avoid damage and wear to the electric cables 27. The rib 35 at the bent portion of the spring holder 9 is integral with the rib 68. The insertion member 34 is a part of the net tube 26.

In the present embodiment, the spring holder 9 and insertion member 34 are formed separately. Both the holder base 31 and the insertion member 34 or both the holder cover 32 and the insertion member 34 can be molded integrally. In this case, the net tube 26 is fixed with the insertion member 34. The net tube 26 can be insert molded to the holder base 31 or the holder cover 32 without the insertion member 34. Then, a number of parts is reduced and a connecting structure of the protective tubes is manufactured with low cost.

In the above embodiment, the corrugated tube 25 and the net tube 26 are utilized as the protective tubes. A flexible and thin vinyl tube (not shown) can be used in place of the net tube 26. The insertion member 34 can be molded integrally with the vinyl tube similarly to the net tube 26. The insertion member 34 can be formed integrally with the holder base 31 or the holder cover 32. The vinyl tube can be directly insert molded to the holder base 31 and cover 32 when they are resin molded.

The corrugated tubes 25 can be disposed at both sides (the first and second holders) of the spring holder 9 or the net tubes 26 at the both sides of the spring holder. For either case, the first holder 28 has a same configuration as that of the second holder 29. It is preferable without saying that the corrugated tube 25 having a relatively high rigidity is utilized at one portion extending to the lower opening 4

(FIG. 2) and the net tube 26 having flexibility and freely bent along the annular wall 5 is utilized at the other portion extending to the gutter 21.

The oval-sectioned corrugated tube 25 is utilized for attempting a compact size of the protector 4 in a thickness direction. A circular-sectioned corrugated tube (not shown) can be used when the protector 4 has a enough space in the thickness direction. In this case, the inner wall of the spring holder 9 is formed in a circular. The section of the net tube 26 has the same section of the corrugated tube 25.

In the embodiment, the spring holder 9 is bent at the center but can be straight. In the case of the straight spring holder, the protective tube 26, the electric cables 27 therein and the leaf spring 6 are bend in a small curvature especially at the end of the second holder 29 and are subjected to a large bending stress. Therefore, the straight type spring holder is only utilized for the annular wall having a large diameter.

FIGS. 12 to 18 show another embodiment of a spring holder for connecting between the protective tubes 25 and 26 in an electric supply apparatus of the present invention.

Figure 12:
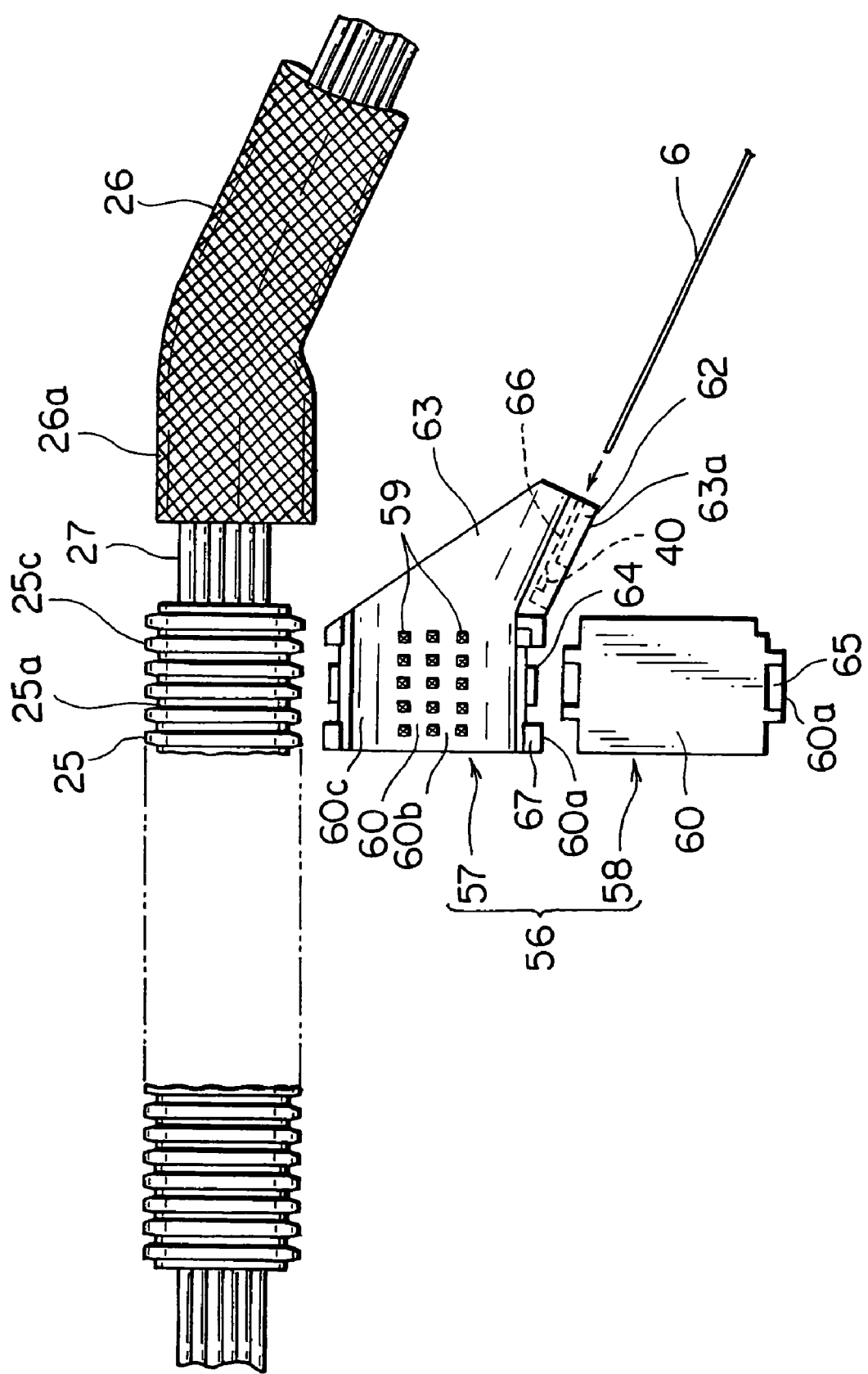
FIG. 12 is an exploded front view showing still another embodiment of a spring holder and a connection with protective tubes of a wiring harness utilizing the spring holder.
Figure 18:
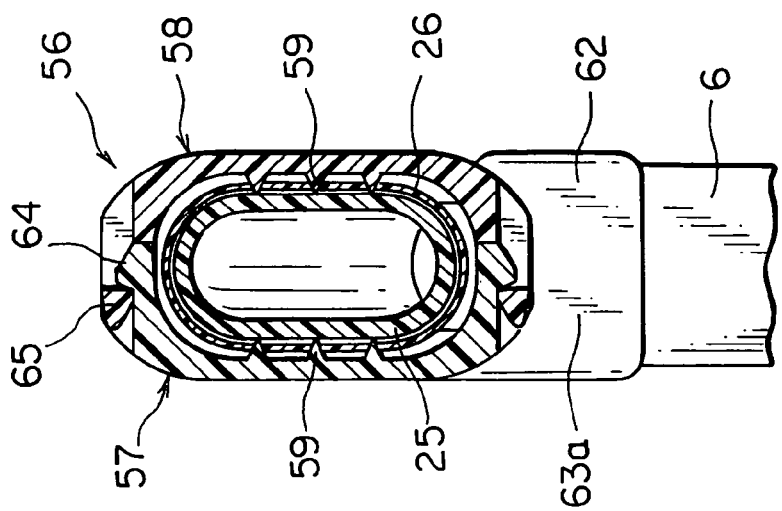
FIG. 18 is a vertical sectional view showing a central portion of the spring holder of FIG. 17.

In the embodiment, the net tube 26 is fixed to the spring holder 9 with the insertion member 34 in FIG. 5. FIGS. 12 to 14 show another embodiment. A plurality of thorny protrusions 59 are disposed inside a holder base 57 (one split holder) and holder cover 58 (the other split holder) of a spring holder 56. An outer face of an end portion 25c of the corrugated tube 25 is covered with an end portion 26a of the net tube 26. Then, the corrugated tube 25 is covered with the holder base 57 and holder cover 58 over the net tube 26. The thorny protrusions 59 penetrate into the net tube 26 and engage with the grooves 25a of the corrugated tube 25 so as to hold the both protective tubes 25,26.

In stead of penetrating the thorny protrusions 59 into the net tube 26, the thorny protrusions 59 may push away the net tube 26 into the grooves 25a of the corrugated tube 25 to engage with the grooves 25a. In this case, the protrusions 59 are not necessary thorny. Accordingly, a fitting force between the protrusions 59 and the net tube 26 becomes smaller than that attained by penetrating the protrusions 59 into the net tube 26, causing a shift of the net tube 26 due to the strong tension. However, the strong tension is exerted on the leaf spring 6 instead of the net tube 26 (FIG. 3) in the protector 4 so that the protrusions without the thorns are practically utilized.

As shown if FIGS. 12 to 14, the spring holder 56 is formed with a synthetic resin. The holder base 57 and holder cover 58 each have a semi-oval portion 60 and the thorny protrusions 59 are disposed at an each inner wall. The holder base 57 has a leaf spring holder 62 extending from the semi-oval portion 60 and a tapered protruding wall 63 above the leaf spring holder 62. The both semi-oval portions 60 are locked together with locking protrusions 64 and engaging frames 65 to form a cylindrical tube having the oval section.

The thorny protrusions 59 are arranged in the each semi-oval portion 60 with an equal pitch which is n times of the pitch of the grooves 25a of the corrugated tube 25, where n is integer such as 1, 2, 3. In the embodiment, three protrusions 59 are arranged in five lines. The number and lines of the protrusions 59 are optional depending on the size and shape of the spring holder.

The protrusions 59 are molded integrally with the semi-oval portions 60 utilizing a synthetic resin and have a triangular or square pyramid, or conical shape. A flat inner face 60b having the protrusions 59 of the each semi-oval portion 60 faces to a vertical side wall 25d (FIG. 16) in a direction of the long axis of the oval-sectioned corrugated tube 25 and curved inner walls 60c at an upper and lower portions of the each semi-oval portion 60 face to curved faces 25e (FIG. 16) at an upper and lower portions of the corrugated tube 25.

The leaf spring holder 62 extends and bends from the semi-oval portion 60. A second receiver face 63a at the leaf spring holder 62 is inclined with respect to a first receiver face 60a of the semi-oval portion 60 and extends into a direction of tangent of the annular wall 5 of the protector 4, see FIG. 2. The leaf spring holder 62 has the slit 66 for inserting the base end of the leaf spring 6 and the locking protrusion 40 to lock the leaf spring 6 as similar to the embodiment of FIG. 5. The first receiver face 60a of the semi-oval portions 60 is flush with the engaging frame 65, the locking protrusion 64 engaging with the frame 65, and ribs 67 disposed at both sides of the engaging frame 65.

The leaf spring holder 62 of FIG. 12 can be formed to extend straight from the semi-oval portion 60 without bending. However, the straight type spring holder is only utilized for the annular wall 5 having a large diameter as described above.

As shown in FIG. 15, an inner face of an end portion 26a of the net tube 26 covers an outer face of an end portion 25c of the corrugated tube 25. The joined tubes 25 and 26 are attached to the holder base 57. The leaf spring 6 is inserted and locked to the leaf spring holder 62 of the holder base 57 before or prior to joining the both protective tubes 25, 26.

Figure 16:
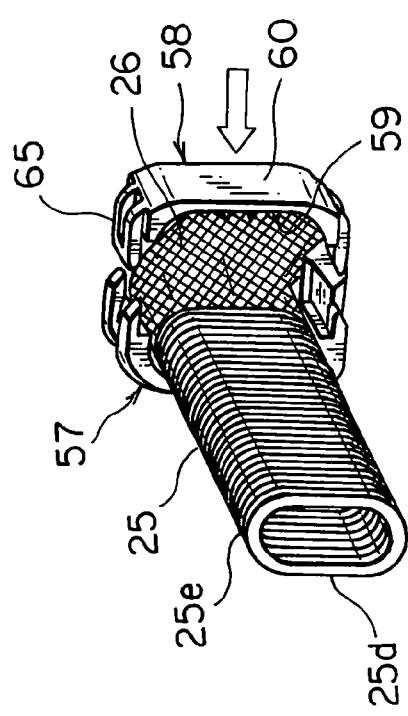
FIG. 16 is a perspective view showing that the holder cover is being covered to the holder base.
Figure 17:
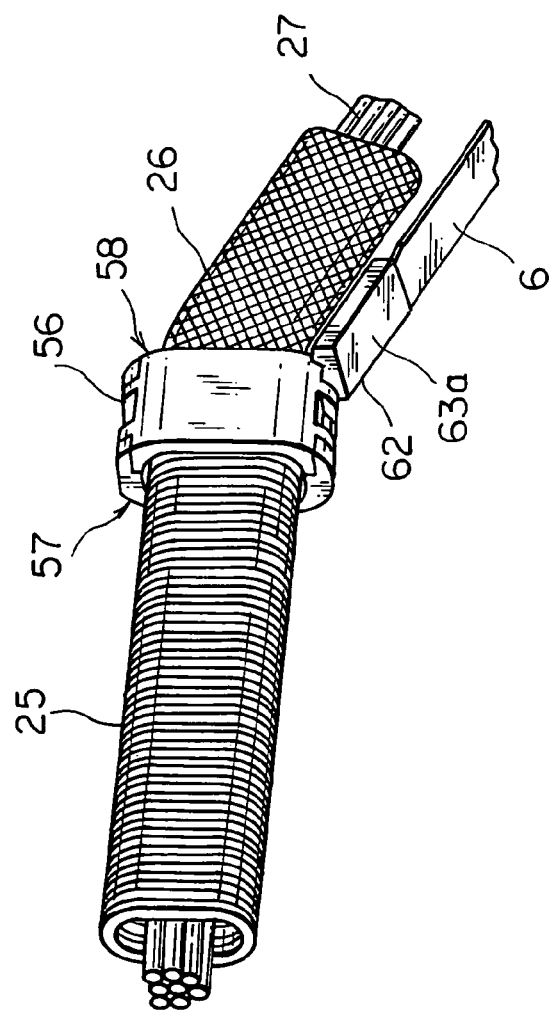
FIG. 17 is a perspective view showing the connection between the both protective tubes with the holder base being covered with the holder cover.

As shown in FIG. 16, the holder cover 58 covers and sandwiches the end portions 25c and 26a of the protective tubes 25 and 26 respectively. The thorny protrusions 59 penetrate into the end portion 26a and engage with the grooves 25a of the corrugated tube 25. At the same time, the holder base 57 and holder cover 58 are locked to each other with the locking means 64 and 65. Accordingly, the corrugated tube 25 and the net tube 26 are easily and firmly connected to each other through the spring holder 56 against the tension.

In the above embodiments, the leaf spring holders 51, 62 are disposed at the second holder 29 of the spring holder 9, see FIG. 5, and at the protruding wall 63 of the spring holder 56, see FIG. 12, respectively. They can be disposed at the first holder 28 of the spring holder 9 and the semi-oval portion 60 of the spring holder 56, respectively. In this case, especially to the embodiment of FIG. 5, the leaf spring 6 is curved along the receiver face 29a of the second holder 29.

Preferably, the spring holder 9 or 56 can be fixed to an end portion of the leaf spring 44 in the conventional electric supply apparatus of FIG. 19. In this case, the net tube 26 is arranged between the spring holder and the wiring harness holder attached to the front end portion of the protector and the corrugated tube 25 is arranged between the spring holder and the vehicle body 47 through the lower opening 45.

In the electric supply apparatus described above, the protector 4 is arranged vertically inside the sliding door, or sliding body. The protector 4 can be arranged horizontally in the vehicle body, or static body, and the one end of the wiring harness 7 is arranged from the elongated opening 14 to the sliding door and the other end thereof is arranged from the wiring harness lead-out to the vehicle body. The electric supply apparatus of the present invention is also adapted to a sliding seat of the motor vehicle or sliding doors other than motor vehicles.

What is claimed is:

1. An electric supply apparatus having a wiring harness comprising: a protector; a leaf spring disposed in the protector; and a spring holder fixed to the leaf spring, wherein said spring holder holds one end portion of a flexible protective member of the wiring harness and one end portion of a rigid protective member of the wiring harness, and wherein the flexible protective member is disposed along the leaf spring and the rigid protective member is arranged from the spring holder to an opening for leading out the wiring harness.

2. The electric supply apparatus as claimed in claim 1, wherein said flexible protective member has an insertion member at the one end portion, and the insertion member is resin-molded with the flexible protective member and fixed to one side portion of the spring holder.

3. The electric supply apparatus as claimed in claim 1, wherein said spring holder has ribs at an other side portion thereof for engaging with grooves of the rigid protective member.

4. The electric supply apparatus as claimed in claim 1, wherein said spring holder has protrusions and said protrusions penetrate into or push away the flexible protective member overlaying the rigid protective member so that the protrusions are engaged with grooves of the rigid protective member.

5. The electric supply apparatus as claimed in claim 1, said protective members are protective tubes.

6. The electric supply apparatus as claimed in claim 1, wherein said spring holder is separable and split holders are joined together with locking means.

7. The electric supply apparatus as claimed in claim 1, further comprising an annular wall disposed in the protector, said annular wall holding a base end portion of the leaf spring, the leaf spring being arranged around the annular wall, and the wiring harness being bent freely outside of the leaf spring.

* * * * *

UNITED STATES PATENT AND TRADEMARK OFFICE
Certificate

Patent No. 7,297,871 B2

Patented: November 20, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Norio Watanabe, Shizuoka (JP); Naoto Kogure, Shizuoka (JP); and Hironori Ochiai, Shizuoka (JP).

Signed and Sealed this Eighth Day of March 2011.

JINHEE J. LEE
*Supervisory Patent Examiner*
Art Unit 2835
Technology Center 2800